(12) United States Patent
Li et al.

(10) Patent No.: US 11,443,193 B2
(45) Date of Patent: Sep. 13, 2022

(54) DOMAIN ADAPTATION FOR MACHINE LEARNING MODELS

(71) Applicant: Adobe Inc., San Jose, CA (US)

(72) Inventors: Kai Li, Somerville, MA (US); Christopher Alan Tensmeyer, Provo, UT (US); Curtis Michael Wigington, San Jose, CA (US); Handong Zhao, San Jose, CA (US); Nikolaos Barmpalios, Sunnyvale, CA (US); Tong Sun, San Ramon, CA (US); Varun Manjunatha, College Park, MD (US); Vlad Ion Morariu, Potomac, MD (US)

(73) Assignee: Adobe Inc., San Jose, CA (US)

( * ) Notice: Subject to any disclaimer, the term of this patent is extended or adjusted under 35 U.S.C. 154(b) by 305 days.

(21) Appl. No.: 16/865,605

(22) Filed: May 4, 2020

(65) Prior Publication Data
US 2021/0334664 A1  Oct. 28, 2021

(30) Foreign Application Priority Data
Apr. 24, 2020  (GR) .............................. 20200100211

(51) Int. Cl.
*G06K 9/00* (2022.01)
*G06N 3/08* (2006.01)
(Continued)

(52) U.S. Cl.
CPC ............. *G06N 3/084* (2013.01); *G06F 17/18* (2013.01); *G06K 9/6232* (2013.01);
(Continued)

(58) Field of Classification Search
CPC ...... G06N 3/084; G06N 20/10; G06N 3/0481; G06N 3/0454; G06F 17/18; G06K 9/6232;
(Continued)

(56) References Cited

U.S. PATENT DOCUMENTS

| 2019/0102908 A1* | 4/2019 | Yang ...................... G06V 10/25 |
| 2020/0265220 A1* | 8/2020 | Zhang .................. G06V 40/172 |
| 2021/0174093 A1* | 6/2021 | Li ............................ G06N 3/08 |

OTHER PUBLICATIONS

Rongchang Xe, "Multi-level Domain Adaptive Learning for Cross-Domain Detection" (Year: 2019).*
(Continued)

*Primary Examiner* — Dhaval V Patel
(74) *Attorney, Agent, or Firm* — FIG. 1 Patents

(57) ABSTRACT

Adapting a machine learning model to process data that differs from training data used to configure the model for a specified objective is described. A domain adaptation system trains the model to process new domain data that differs from a training data domain by using the model to generate a feature representation for the new domain data, which describes different content types included in the new domain data. The domain adaptation system then generates a probability distribution for each discrete region of the new domain data, which describes a likelihood of the region including different content described by the feature representation. The probability distribution is compared to ground truth information for the new domain data to determine a loss function, which is used to refine model parameters. After determining that model outputs achieve a threshold similarity to the ground truth information, the model is output as a domain-agnostic model.

20 Claims, 7 Drawing Sheets

(51) Int. Cl.
   *G06N 20/10* (2019.01)
   *G06K 9/62* (2022.01)
   *G06F 17/18* (2006.01)
   *G06V 10/75* (2022.01)
   *G06V 20/20* (2022.01)
   *G06V 30/413* (2022.01)
   *G06V 30/414* (2022.01)

(52) U.S. Cl.
   CPC ............ *G06K 9/6277* (2013.01); *G06N 20/10* (2019.01); *G06V 10/751* (2022.01); *G06V 20/20* (2022.01); *G06V 30/413* (2022.01); *G06V 30/414* (2022.01)

(58) Field of Classification Search
   CPC .. G06K 9/6277; G06K 9/6273; G06V 10/751; G06V 20/20; G06V 30/413; G06V 30/414; G06V 10/25; G06V 10/82
   See application file for complete search history.

(56) References Cited

OTHER PUBLICATIONS

Fie Zhou, "Deep Learning Research With an Expectation-Maximization Model for Person Re-Identification" (Year: 2020).*
KUnaki Saito, Strong weak distribution alignment for adaptive object detection (Year: 2019).*
Saito,"Strong-Weak Distribution Alignment for Adaptive Object Detection", Apr. 5, 2019, 14 pages.

* cited by examiner

DOMAIN ADAPTATION FOR MACHINE LEARNING MODELS

CLAIM OF PRIORITY

This application claims priority under 35 USC 119 or 365 to Greek Application No. 20200100211, filed Apr. 24, 2020, the disclosure of which is incorporated in its entirety.

Performance of machine learning models degrades significantly when applied to new data that is different from a domain of training data used to train and produce the model. This degradation phenomenon is often referred to as data domain-shift. In many scenarios, it is difficult or impossible to obtain labeled training data that sufficiently represents all types of data that may be processed by a machine learning model (e.g., due to data privacy, limited labeled data for a certain domain, and so forth). Therefore, conventional approaches to training machine learning models leverage a large amount of labeled data constrained to a specific domain (e.g., large amounts of images of birds with labels identifying different characteristics and/or bird types) to train a model for a specific objective (e.g., bird detection and classification). However, such conventional approaches often result in over-fitted models, which are unable to produce reliable outputs when processing input data of a different domain. For instance, the example model trained to identify birds from photographic images would likely generate unreliable outputs when provided images of artistic sketches of birds.

To address these shortcomings, various conventional approaches to training machine learning models attempt to enhance model efficiency by augmenting or normalizing training data during the training process. Collectively, conventional approaches to training machine learning models aim to model the human ability to quickly understand and process diverse concepts. However, conventional approaches are unable to mimic the ability of a human to identify cross-domain similarities and differences. For instance, in a document classification example, a machine learning model may be trained to identify text, raster graphic, and vector graphic components of documents in a specific domain, such as Portable Document Format (PDF) documents authored in English. While a human observer would readily be able to identify document text, raster graphic, and vector graphic components regardless of their domain (e.g., differently formatted documents and/or documents authored in different languages), this data domain-shift obstacle is insurmountable by conventional approaches to training machine learning models.

As a result, conventional approaches restrict model training data to specific domain types, and train different models for different domain types. Consequently, conventional approaches consume significant computational and network resources in training a model on diverse datasets with the goal of mimicking a human's ability to perceive cross-domain similarities and differences, resulting in over-fitted models that are limited to considering data of a same format and type as data of the training dataset.

SUMMARY

Adapting a machine learning model to reliably process input data of a different domain than training data used to configure the machine learning model for a specified task or objective is described. A domain adaptation system receives the machine learning model, such as a model configured to process input data of a first domain and generate an output that classifies different features of the input data with labels identifying the different features. The machine learning model may be configured according to a variety of different tasks or objectives, such as speech recognition, natural language understanding, digital content processing, digital content generation, graph classification, and so forth. The domain adaptation system trains the machine learning model to process input data of a second domain that differs from the first domain by causing the machine learning model to perform an auxiliary task that is different from the task or objective for which the machine learning model was originally trained, in a supervised learning environment. For instance, such an auxiliary task may include causing the machine learning model to generate a feature representation for the second domain input data, where the feature representation describes at least one feature channel representing content included in the second domain input data. In performing the auxiliary task, the domain adaptation system then generates a probability distribution for each of a plurality of discrete regions (e.g., pixels) of the second domain input data to describe a likelihood of the discrete region including each feature channel set forth in the feature representation.

Using ground truth information for the second domain input data, representing an ideal output of the machine learning model when processing the second domain input data according to the auxiliary task, the domain adaptation system computes a loss function by comparing the ground truth information to the probability distribution. In this manner, the domain adaptation system is configured to determine how well the machine learning model is performing the auxiliary task involving data of a different domain. The loss function is used to modify at least one parameter of the machine learning model to improve performance of the machine learning model with respect to data that differs from training data used to originally configure the model. The domain adaptation system continues to refine parameters of the machine learning model by processing additional instances of input data defined by a domain that differs from the training data domain for the model until determining that outputs (e.g., probability distributions) generated from new domain input data are within a threshold difference to corresponding ground truth data for the auxiliary task. In response to determining that the threshold difference is satisfied, the model with its current parameters is output as a model configured to reliably produce outputs, from input data of the first and second domains, according to the task for which the machine learning model was originally trained. In this manner, the model may be refined according to the auxiliary task using data from any number of different domains, such that it becomes a domain-agnostic model configured to reliably produce outputs, according to the model's original task, from input data of the number of different domains.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
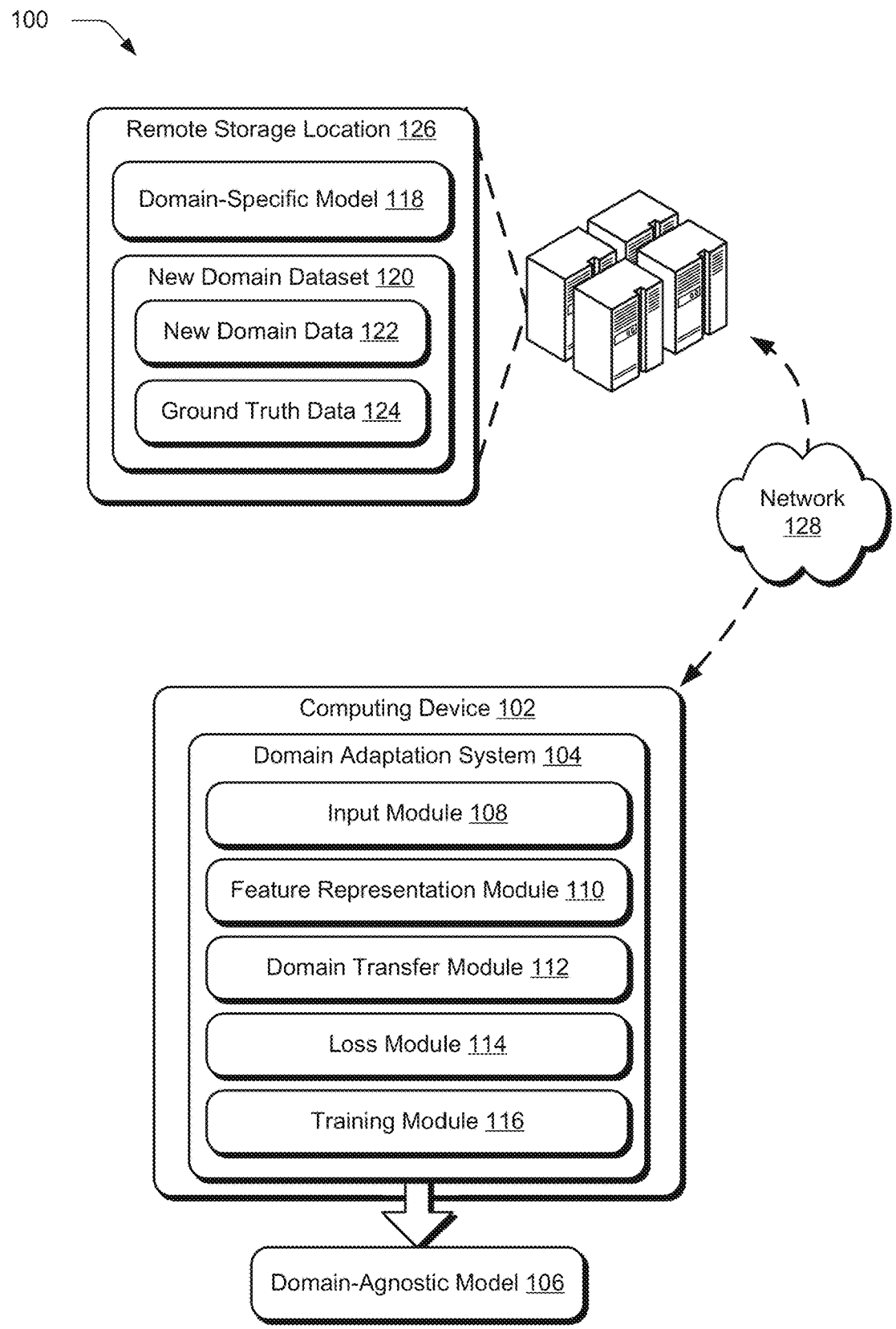
FIG. 1 is an illustration of an environment in an example implementation that is operable to employ the domain adaptation techniques described herein.

With advances in computing device technology, machine learning models such as deep neural networks are increasingly used to perform specified tasks and objectives such as speech recognition, natural language understanding, digital image processing, digital image generation, graph classification, combinations thereof, and so forth. A major challenge remains training these models to perform their specified tasks and objectives in an accurate and efficient manner. Regardless of whether supervised or unsupervised training techniques are used to train a model for a specified task or objective, performance of models trained by these conventional approaches suffer significantly when applied to new data that is unlike the training data used to generate the model.

To improve accuracy of outputs generated by these machine learning models, conventional training approaches increase a number of data samples provided to the model during training, with the hope that the increased data size will enable the model to adapt to different formats and types of input data. However, these conventional model training approaches often require manual user input to guide training of the model. Additionally, as the amount of data used to train the model increases, so too increases the amount of computational and network resources required to both collect the data and process the data to train the model.

To mitigate the amount of network and computational resources required to train a machine learning model for its specified ask or objective, some conventional approaches rely on information gleaned from training other models, where different parameters used to generate a model are monitored during training and similarly applied while training an untrained model for a different task or objective. However, these conventional approaches are limited to tasks or objectives for which sufficient labeled data is available to produce a trained model. In many practical cases, it is difficult or impossible (e.g., due to data privacy concerns) to obtain labeled training data that represents a distribution of data points useable to sufficiently define a domain. For instance, in implementations where a model is trained to perform a document classification task, the large number of different document domains creates an obstacle for conventional model training approaches.

Faced with the manual input required to obtain sufficient amounts of training data from each different domain, coupled with the network and computational resources required to process each domain training set, conventional approaches instead opt to train a single model for classifying a single document domain. Such conventional approaches thus produce limited-scope models that are restricted to classifying documents of a particular file type authored in a particular language, which are unreliable when applied to documents of a different file type or authored in a different language. For instance, conventional approaches that train a model to classify document structure elements (e.g., paragraphs, list items, tables, figures, headers, etc.) from document images (e.g., scanned copies) are limited to producing a model that reliably classifies only documents of a certain file type (e.g., PDF documents) authored in a specified language (e.g., Spanish), and formatted in a certain layout (e.g., columned).

Because of the immense amount of training data (e.g., millions of pages) required to configure such a model for a specific domain (e.g., specific language, specific file type, and specific layout), adapting such conventionally trained models to process data of a different domain is often foregone due to immense time and computational resources required to do so (e.g., obtaining unlabeled training data, manually annotating the training data, processing the training data to fine-tune model weights, etc.). Consequently, conventional approaches to adapting a model to reliably process data that is different from a domain upon which the model was originally trained are faced with prohibitive time and computational resource requirements, resulting in unreliable models.

Accordingly, adapting a machine learning model to a domain that is different from a domain upon which the machine learning model was originally trained is described. A domain adaptation system receives a trained model and an indication of a task or objective for which the model was trained, as well as an indication of a domain defining training data used to produce the trained model. The domain adaptation system identifies one or more portions of the trained model configured to extract features from input data and use the extracted features to generate an output according to the specified task or objective for which the model was trained. The domain adaptation system then leverages this portion of the model to process data of a different domain for which the model is to be adapted, according to a shared auxiliary task, such as the task for which the model is trained (e.g., document classification given an image of a document as input).

Leveraging this portion of the model configured to extract features from input data of a training domain, the domain adaptation system aligns features of a target domain (e.g., the different domain for which the model is to be adapted) with features of the training domain by processing different domain data as though it were training domain data. For instance, continuing the document classification task example, a trained model may be configured to first extract features of a PDF document authored in Spanish that broadly decompose the document into a text layer, a raster graphic layer, and a vector graphic layer. Because these broad features correlate well with structural elements of the document to be detected and classified by the model, features discriminative of the different layers are likewise discriminative of the model's ultimate different classification outputs.

The domain adaptation system then compares the features extracted from new domain data to labeled ground truth information for processing the new domain data according to the auxiliary task to determine how accurately the trained model adapts to the new domain. Parameters of the trained model are then adjusted based on this comparison, and another instance of new domain data is processed, with the cycle continuing until the features output by the trained model are determined to be reliable beyond the domain for which the model was initially trained. Upon determining the model reliably processes new domain data according to the auxiliary task, the model and its current parameters are output as a model configured to reliably process new domain data according to its original task, without ground truth or other data representing an ideal output of the new domain data processed according to the model's original task.

By leveraging a feature extraction component of a trained model, the domain adaptation system advantageously generates a domain-agnostic model that is not over-fitted and capable of processing input data that falls outside a distribution describing the input data used to train the model. Furthermore, the domain adaptation system represents an improvement over conventional approaches to model training in that the amount of new domain training data is drastically reduced, such that the techniques described herein do not require vast amounts (e.g., millions) of annotated training data samples to generate a reliable model. Consequently, the techniques described herein enable generation of a trained model configured to handle diverse input data without requiring the size and scope of training data otherwise necessitated by conventional approaches, thereby reducing an amount of computational and network resources used in training a model.

Example Environment

FIG. 1 is an illustration of a digital medium 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 7.

The computing device 102 is illustrated as including a domain adaptation system 104. The domain adaptation system 104 is representative of functionality of the computing device 102 to generate a domain-agnostic model 106, which represents an instance of a machine learning model configured to generate reliable outputs from input data that is different from a domain of training data used to initially train the machine learning model. As described herein, the domain-agnostic model 106 is representative of any type of machine learning model, including but not limited to models with architectures based on neural networks (e.g., fully-connected neural networks, convolutional neural networks, or recurrent neural networks), deep learning networks, generative adversarial networks (GANs), decision trees, support vector machines, linear regression, logistic regression, Bayesian networks, random forest learning, dimensionality reduction algorithms, boosting algorithms, combinations thereof, and so forth.

To generate the domain-agnostic model 106, the domain adaptation system 104 employs an input module 108, a feature representation module 110, a domain transfer module 112, a loss module 114, and a training module 116. The input module 108, the feature representation module 110, the domain transfer module 112, the loss module 114, and the training module 116 are each implemented at least partially in hardware of the computing device 102 (e.g., through use of a processing system and computer-readable storage media), as described in further detail below with respect to FIG. 7.

The input module 108 is configured to obtain a domain-specific model 118 to be used as the basis for generating the domain-agnostic model 106. As described herein, the domain-specific model 118 is representative of any type of machine learning model configured to identify patterns in training data, the properties of which define the domain for the domain-specific model 118, and generate output predictions based on the identified patterns. In addition to obtaining the domain-specific model 118, the input module 108 is configured to receive a new domain dataset 120 for use in training the domain-specific model 118 to generate the domain-agnostic model 106. The new domain dataset 120 includes new domain data 122 and ground truth data 124, which corresponds to ideal or optimal outputs to be produced by the model when processing the new domain data 122 according to an auxiliary task. In this manner, the new domain dataset 120 is useable by the domain adaptation system 104 to compute a loss function for generating the domain-agnostic model 106 based on the domain-specific model 118.

For instance, in an example implementation where the domain-specific model 118 is configured for document classification, the domain-specific model 118 may be configured to classify a specific domain of input documents, such as PDF documents authored in the English language. In this example implementation, the new domain data 122 may include one or more documents having characteristics that distinguish the one or more documents from the specific domain of input documents for which the domain-specific model 118 is trained. For instance, the new domain data 122 may include PDF documents authored in one or more languages other than English (e.g., Chinese, Latin, Devanagari, Arabic, etc.). Alternatively or additionally, the new domain data 122 may include PDF documents that are authored in English but formatted differently than English scanned PDF documents used to generate the domain-specific model 118. Alternatively or additionally, the new domain data 122 may include data formatted differently than a PDF document (e.g., image data, plain text data, rich text data, Hyper-Text Markup data, presentation format data, combinations thereof, and so forth). Continuing the document classification example, regardless of a type or format of the new domain data 122, the ground truth data 124 includes labels identifying, for each instance of new domain data 122, included content (e.g., text content, vector graphic content, raster graphic content, combinations thereof, and so forth). In some implementations, the ground truth data 124 is representative of metadata for corresponding new domain data 122, such as metadata included in a born-digital PDF document that describes content depicted at each pixel location of the PDF document.

Alternatively, in an example implementation where the domain-specific model 118 is configured for speech recognition of English utterances, the new domain data 122 of the new domain dataset 120 may include utterances in languages other than English, with the ground truth data 124 specifying information describing each utterance (e.g., one or more vocabulary words included in the utterance, an identification of a speaker of the utterance, etc.). In another example implementation where the domain-specific model 118 is configured for graph classification of user purchase information relating to purchases from a particular seller's marketplace, the new domain data 122 may include information describing user behavior on one or more different domains (e.g., social data describing a user's interactions with one or more social networking sites, browsing history for the user, purchase activity of the user, user profile information, etc.), with the ground truth data 124 including a visual representation (e.g., dot graph) representing similarities and differences among the data points. Thus, the new domain dataset 120 is representative of any suitable type of information useable to train a machine learning model, where the ground truth data 124 represents the ideal expected result of outputs of the domain-agnostic model 106 when processing the new domain data 122 as input(s), according to the auxiliary task.

The input module 108 is configured to obtain the domain-specific model 118 and the new domain dataset 120 from any suitable source. For example, one or more of the domain-specific model 118, the new domain data 122, or the ground truth data 124 may be received via input from a user of a computing device implementing the domain adaptation system 104, as described in further detail below with respect to FIG. 7. Alternatively or additionally, one or more of the domain-specific model 118, the new domain data 122, or the ground truth data 124 may be obtained by the input module 108 from a location other than the computing device implementing the domain adaptation system 104, such as from remote storage location 126, via network 128. Alternatively or additionally, the domain-specific model 118, the new domain data 122, and the ground truth data 124 may be received from a plurality of different locations, such as via input to the computing device 102, from remote storage location 126, or from a different computing device via network 128. The input module 108 is configured to communicate the domain-specific model 118 and the new domain dataset 120 to other modules of the domain adaptation system 104 for use in generating the domain-agnostic model 106, such as to the feature representation module 110 and the loss module 114.

The feature representation module 110 is representative of functionality of the domain adaptation system 104 to extract features from the new domain data 122 using the domain-specific model 118. For instance, in an example scenario where the domain-specific model 118 includes a plurality of networks and/or layers to extract features at different levels (e.g., local and global levels) from domain-specific input data (e.g., English born-digital PDF documents), the feature representation module 110 may use one or more of these networks and/or layers of the domain-specific model 118 to process the new domain data 122 and extract features in a similar manner (e.g., extracting low-level local features from a scanned PDF document authored in Arabic). As described in further detail below with respect to FIGS. 2 and 3, the feature representation extracted from the new domain data 122 may specify different feature channels that can be used to classify new domain data 122, along with size information for the new domain data 122. For instance, continuing the example scenario where the domain-specific model 118 is configured to extract features from born-digital English PDF documents, a feature representation generated for a scanned image of a PDF document authored in Arabic may indicate three feature channels for classifying the Arabic scanned PDF document (e.g., vector graphics, text, and raster graphics) according to an auxiliary task.

The domain transfer module 112 is representative of functionality of the domain adaptation system 104 to generate a feature probability distribution for new domain data 122, based on the feature representation generated by the feature representation module 110. The feature probability distribution generated by the domain transfer module 112 includes probability scores indicating a probability that each discrete component of new domain data 122 corresponds to one of the feature channels indicated in the corresponding feature representation. For instance, in an example scenario where the new domain data 122 is an image and the corresponding feature representation includes three different feature channels, the feature probability distribution may include three binary distributions for each pixel of the image, where each binary distribution represents a probability score of the pixel depicting a corresponding feature channel. In this manner, the probability distribution for each discrete region of the new domain data 122 (e.g., each image pixel) is not mutually exclusive, and accounts for scenarios where a single discrete region of new domain data 122 includes content corresponding to different feature channels (e.g., overlapping text and raster graphics in an image pixel).

The loss module 114 is representative of functionality of the domain adaptation system 104 to monitor effectiveness of the domain transfer module 112 in generating the feature probability distribution for new domain data 122 according to the auxiliary task. To do so, the loss module 114 is configured to analyze outputs of the domain transfer module 112 produced from a corresponding feature representation generated by the feature representation module 110 and compare the outputs to the ground truth data 124 of the new domain dataset 120 for the auxiliary task. The loss module 114 is configured to compare outputs of the domain transfer module 112 to the ground truth data 124 using any suitable metric, which may depend on a specific task for which the domain-specific model 118 is trained.

For instance, the loss module 114 may quantify an accuracy of the feature probability distribution generated for the new domain data 122 by considering absolute differences between the feature probability distribution and the ground truth data 124. Alternatively or additionally, the loss module 114 may calculate a mean squared error of the feature probability distribution for new domain data 122 relative to the corresponding ground truth data 124. In this manner, the loss module 114 is configured to monitor the effectiveness of the domain transfer module 112 using any suitable type of loss function, such as likelihood loss, cross entropy loss, L1 loss, squared loss, combinations thereof, and so forth. To improve a speed and efficiency at which the domain adaptation system 104 generates the domain-agnostic model 106, the loss module 114 is configured to communicate the determined loss to the domain transfer module 112, which is useable to fine-tune weights of the domain transfer module 112, as described and illustrated in further detail below with respect to FIGS. 2-4.

In addition to fine-tuning the domain transfer module 112, the loss function generated by the loss module 114 is further useable by the training module 116 to fine-tune weights of the domain-specific model 118 in generating the domain-agnostic model 106. For instance, in generating the domain-agnostic model 106, the training module 116 may use weights of the domain-specific model 118 to initialize the domain-agnostic model 106. Weights of the domain-agnostic model 106 are then modified based on the loss function computed by the loss module 114, such that the domain-agnostic model 106 is properly parameterized to reliably handle input data that does not fall within a domain distribution of training data used to generate the domain-specific model 118. A manner in which weights of the domain-agnostic model 106 may be initialized and modified is described in further detail below with respect to FIG. 4.

Having considered an example digital medium environment, consider now a discussion of an example implementation of generating a domain-agnostic model using the techniques described herein.

Figure 2:
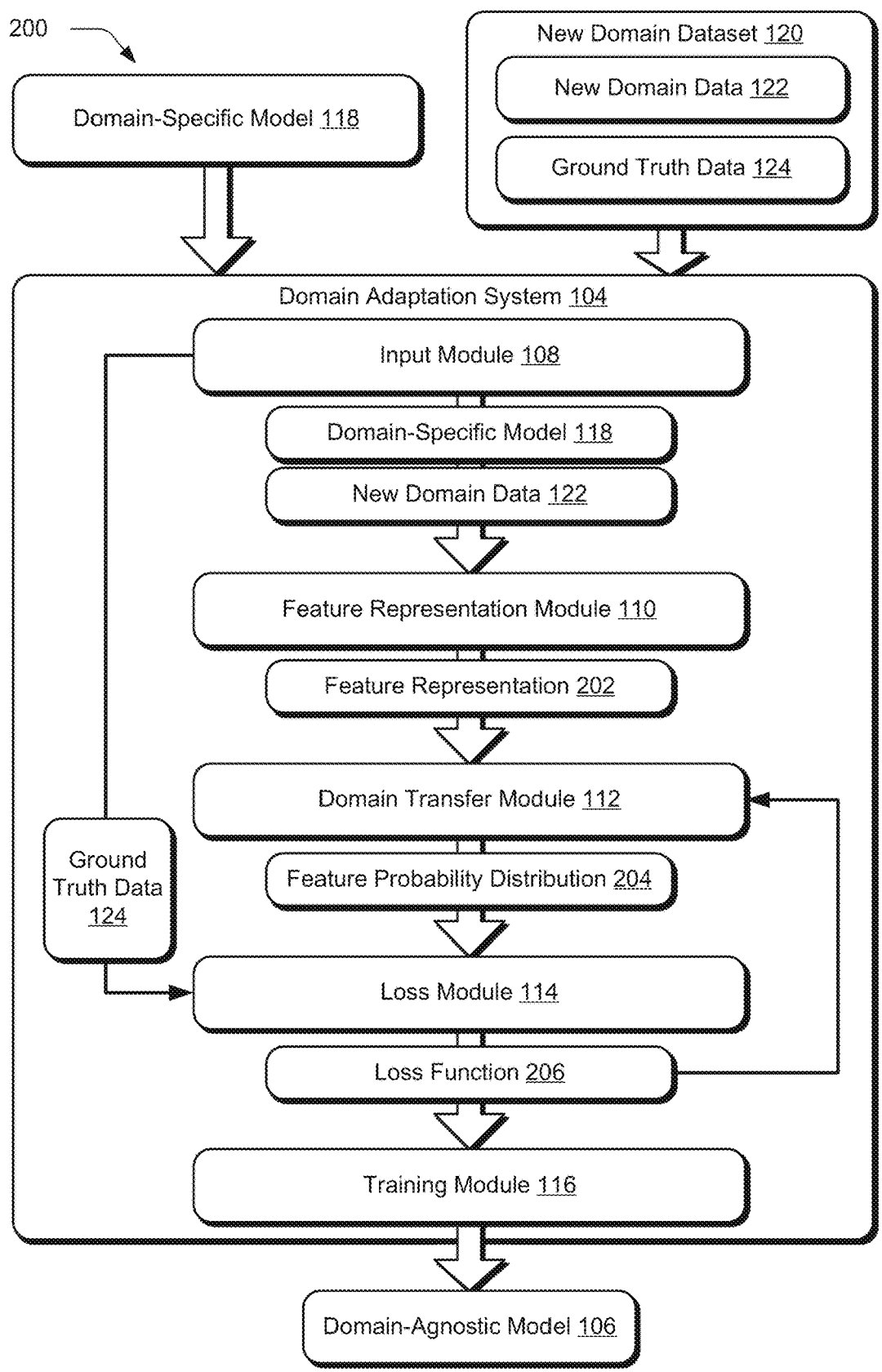
FIG. 2 illustrates an example implementation in which the domain adaptation system of FIG. 1 generates a domain-agnostic model using the techniques described herein.

FIG. 2 illustrates an example system 200 useable to generate a domain-agnostic model 106, which is representative of the domain-specific model 118 being trained to generate reliable outputs from inputs that are of a different domain than training data used to generate the domain-specific model 118. As described herein, an output of the domain-agnostic model 106 is considered reliable when the output is within a threshold similarity to a ground truth data for input data from which the output was generated (e.g., within a threshold similarity to ground truth data 124 when provided new domain data 122 as input). In the illustrated example, system 200 includes modules of the domain adaptation system 104 as introduced with respect to FIG. 1, such as the input module 108, the feature representation module 110, the domain transfer module 112, the loss module 114, and the training module 116. In one example, system 200 is implemented on a single computing device (e.g., computing device 102 of FIG. 1). In another example, system 200 is implemented on more than one computing device, as described in further detail below with respect to FIG. 7.

In the example system 200, the domain adaptation system 104 receives the domain-specific model 118 and a new domain dataset 120 for use in generating the domain-agnostic model 106. As described herein, the domain-specific model 118 is representative of a machine learning model trained to generate predicted outputs, according to an original task or objective, from input data that is defined by at least one data type having one or more enumerated data values. For instance, the input data used to train the domain-specific model 118 may comprise user identifying information, where one data type of the input data is "gender" and another data type is "location." Enumerated values for the gender data type may include male, female, and null (e.g., representative of unknown or inapplicable). Enumerated values for the location data type may include any data format useable to identify a geographic location, such as city, county, state, country, zip code, mailing address, and so forth. Thus, a domain to which the domain-specific model 118 corresponds may be defined in terms of the data types and data values of training data used to generate the domain-specific model 118, and is not limited to any one or more specific data types and values.

In contrast to the domain of the domain-specific model 118, the type(s), format(s), and associated value(s) of new domain data 122 and ground truth data 124 included in the new domain dataset 120 are representative of data having at least one of a different type, format, or value than training data used to generate the domain-specific model 118. In this manner, the new domain dataset 120 may comprise numerical data, textual data, audio data, image data, combinations thereof, and so forth, with formats, types, and values dependent on a specific task or objective upon which the domain-agnostic model 106 is to be trained.

Upon receiving the domain-specific model 118 and the new domain dataset 120, the input module 108 communicates the domain-specific model 118 and the new domain data 122 of the new domain dataset 120 to the feature representation module 110. In some implementations, the input module 108 is configured to process the new domain data 122 prior to communication to the feature representation module 110 in order to format the new domain data 122 in a manner for training the domain-agnostic model 106. Additionally, the input module 108 may communicate one or more parameters for use in generating the domain-agnostic model 106 to the training module 116. In an example implementation, the input module 108 is configured to analyze the domain-specific model 118 and extract parameters, weights, and other settings of the domain-specific model 118 for use in initializing the domain-agnostic model 106, such that the training module 116 can fine-tune these initialized parameters in generating the domain-agnostic model 106. In this manner, model parameters extracted by the input module 108 may include initialized weights for one or more neurons of the domain-agnostic model 106, such as the neurons described and illustrated with respect to FIG. 4. Alternatively or additionally, the model parameters may be specified via input by a user of the computing device implementing the domain adaptation system 104, as described in further detail below with respect to FIG. 7. Alternatively or additionally, initial parameters for the domain-agnostic model 106 may be randomly configured by the input module 108, specified by an architect of the domain adaptation system 104, received from a different computing device, combinations thereof, and so forth.

Upon receipt of the domain-specific model 118 and the new domain data 122, the feature representation module 110 is configured to generate a feature representation 202 by applying the new domain data 122 to at least a portion of the domain-specific model 118. For instance, in an example implementation, the domain-specific model 118 may be configured to perform document classification given input images of documents of a specified file type authored in a designated language. To do so, the domain-specific model 118 may include a plurality of different networks (e.g., convolutional neural networks, classifier networks, combinations thereof, and so forth), where local features are extracted, followed by global feature extraction, and the local and global features are used together to provide context for different regions of a document and perform document classification, an example of which is illustrated and described in further detail below with respect to FIG. 3. In such an example implementation, the feature representation module 110 is configured to employ at least one of the different networks of the domain-specific model 118 to generate a feature representation 202 for the new domain data 122. For instance, the feature representation module 110 may use a local classifier network of the domain-specific model 118 to generate the feature representation 202 by processing the new domain data 122 according to an objective or task for which the network of the domain-specific model 118 was trained.

In this manner, the feature representation 202 is representative of features extracted from the new domain data 122 using one or more components of the domain-specific model 118. Thus, the feature representation 202 may specify different feature channels that are useable to classify new domain data 122, along with size information for the new domain data 122. For instance, in an example implementation where the domain-specific model 118 is configured to extract features from training data comprising born-digital PDF documents authored in English, the new domain data 122 may include a scanned (i.e., a raster image of a) PDF document authored in Arabic. In such an example implementation, the feature representation module 110 may employ a local classifier network of the domain-specific model 118 to process the new domain data 122 and generate feature representation 202, which may indicate three feature channels for classifying the document (e.g., vector graphics, text, and raster graphics). The feature representation module 110 then communicates the feature representation 202 to the domain transfer module 112.

Upon receipt of the feature representation 202, the domain transfer module 112 is configured to generate a feature probability distribution 204 for the new domain data 122 using information included in the feature representation 202. In some implementations, the domain transfer module 112 employs its own machine learning model (e.g., a convolutional neural network) to generate the feature probability distribution 204, given the feature representation 202 and the new domain data 122 as inputs. The feature probability distribution 204 is representative of probability scores for each discrete component or region of the new domain data 122, where the probability score indicates a likelihood of the corresponding region or component of the new domain data 122 including one or more of the feature channels described in the feature representation 202.

For instance, in an example implementation where the new domain data 122 comprises an image, the corresponding feature representation 202 may include three different feature channels useable to differentiate among different content depicted by the image. In such an example implementation, the feature probability distribution 204 may include three binary distributions for each pixel of the image, where each binary distribution represents a probability of the pixel depicting content classified under a corresponding feature channel. In this manner, the feature probability distribution 204 may be output by the domain transfer module 112 in any suitable format. In this manner, the feature probability distribution 204 may describe probability scores for each discrete region of new domain data 122 as corresponding to one or more feature channels set forth in the feature representation 202 numerically, textually, graphically, and so forth.

For example, if the new domain data 122 comprises an image, the feature probability distribution 204 may graphically represent probabilities of different pixels of the image as depicting content classified by one or more feature channels described in the feature representation 202. Continuing this example, the feature probability distribution 204 may comprise an instance of the image, where probability scores are rendered as different pixel colors (e.g., red for pixels corresponding to a first feature channel, yellow for pixels corresponding to a second feature channel, blue for pixels corresponding to a third feature channel, orange for pixels corresponding to the first and second feature channels, green for pixels corresponding to the second and third feature channels, brown for pixels corresponding to all three feature channels, and so forth).

Thus, the feature probability distribution 204 represents a rough estimate of the output that may be obtained by processing the new domain data 122 using the domain-specific model 118. However, because processing the new domain data 122 using the parameters of the domain-specific model 118 is presumed to generate unreliable outputs by virtue of the domain data-shift problem, the domain adaptation system 104 is configured to monitor a quality of the feature probability distribution 204 as it processes different instances of new domain data 122. Based on this monitoring, the domain adaptation system 104 determines one or more adjustment values for fine-tuning weights or parameters of the domain-agnostic model 106 and/or components of the domain adaptation system 104 itself (e.g., weights or parameters of a convolutional neural network implemented by the domain transfer module 112 in generating the feature probability distribution 204).

To do so, the domain adaptation system 104 employs the loss module 114. The loss module 114 is configured to receive the feature probability distribution 204 and generate a loss function 206 to be implemented by the training module 116 for use in refining one or more parameters of the domain-agnostic model 106. To determine the loss function 206, the loss module 114 compares the feature probability distribution 204 generated for an instance of new domain data 122 to corresponding ground truth data 124 in the new domain dataset 120. The loss module 114 is configured to compare the feature probability distribution 204 to the ground truth data 124 in a variety of different manners, such as based on absolute differences, using mean squared error, and the like.

Upon determining the loss function 206, the loss module 114 is configured to communicate the loss function 106 to the training module 116 for refining weights of the domain-agnostic model 106 that enable generation of reliable outputs, provided new domain data 122 and original domain data as input. In order to ensure that the domain-agnostic model 106 is stable enough to reliably process data that is different from a domain of data upon which the domain-specific model 118 was trained, the domain adaptation system 104 is configured to process different instances of new domain data 122 and generate a corresponding loss function 206 for each new instance of new domain data 122. To accelerate the manner in which the domain adaptation system 104 generates the domain-agnostic model 106, the loss module 114 is further configured to provide the loss function 206 as feedback to the domain transfer module 112. Upon receipt of the loss function 206, the domain transfer module 112 is configured to update one or more weights of a network or model used to generate the feature probability distribution 204. In this manner, the domain adaptation system 104 leverages differences between the feature probability distributions 204 generated from new domain data 122 and the corresponding ground truth data 124 in a supervised manner to identify optimal parameters for use in the domain-agnostic model 106.

In response to determining that the feature probability distributions 204 generated by the domain transfer module 112 are within a threshold difference to the ground truth data 124, as guided by the loss function 206, the training module 116 outputs the domain-agnostic model 106 as an instance of the domain-specific model 118 that is not limited to processing input data constrained by a training data domain used to generate the domain-specific model 118. This threshold difference may be any suitable amount and quantified in any suitable manner. In some implementations, the threshold difference is zero, requiring an exact match between a feature probability distribution 204 and a ground truth data 124 for a new domain data 122. In some implementations, the threshold difference may be specified via user input to a computing device implementing the domain adaptation system 104, as described in further detail below with respect to FIG. 7.

Having considered an example system for generating a domain-agnostic model, consider now an example implementation of generating a domain-agnostic model based on an architecture of a domain-specific model.

Figure 3:
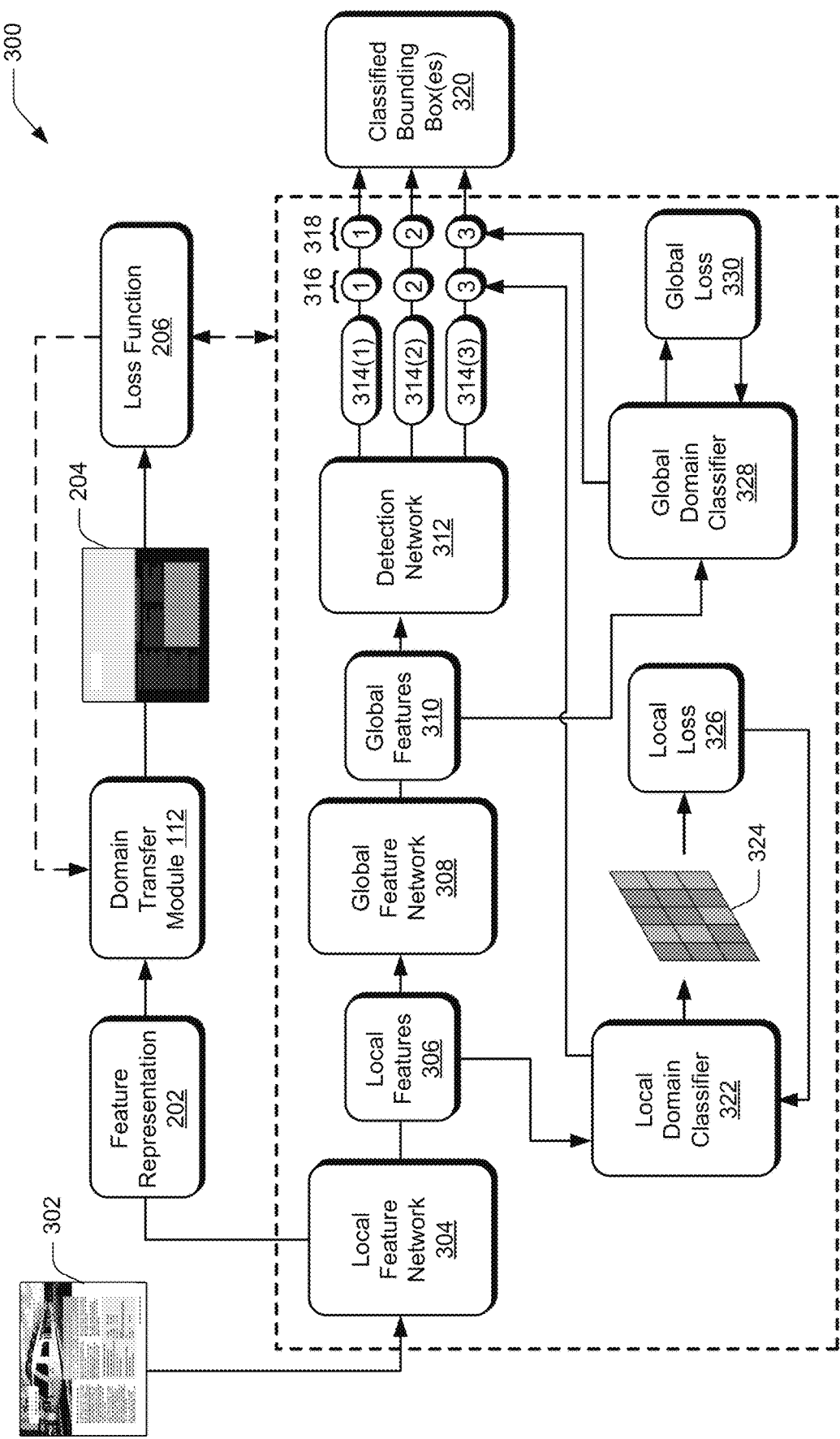
FIG. 3 illustrates an example implementation in which the domain adaptation system of FIG. 1 trains a domain-specific model to adapt to a new domain using the techniques described herein.

FIG. 3 illustrates an example implementation 300 of the domain adaptation system 104 determining a loss function 206 for use in generating a domain-agnostic model 106 in accordance with the techniques described herein. The illustrated example depicts a scenario in which the domain adaptation system 104 generates a domain-agnostic model 106 by processing new domain data based on the architecture of an example domain-specific model 118. Specifically, the illustrated example of FIG. 3 includes architectural components of a domain-specific model 118 configured according to a document object detection objective. Under the document object detection objective, the domain-specific model 118 is trained to process multi-channel input images that are each representative of a first domain (e.g., columned scanned PDF documents authored in English) and output content descriptions of content included in discrete regions of each input image (e.g., paragraph content, header content, figure content, table content, list item content, etc.) To achieve this objective, the domain-specific model 118 includes a plurality of different networks, classifiers, and functional blocks bounded by the dashed outline, which are each representative of one or more machine learning models and/or computational modules configured to process input data 302.

The input data 302 is representative of an instance of new domain data 122 having at least one characteristic that differentiates it from training data used to configure or generate the domain-specific model 118. For instance, the input data 302 is illustrated as a born-digital PDF document authored in English and formatted according to a particular layout (e.g., single column, two column, etc.). Upon receipt of the input data 302, the domain-specific model 118 employs a local feature network 304 to extract local features 306 from the input data 302. In the illustrated example, the local feature network 304 is representative of a first stage of a faster region convolutional neural network (FRCNN) configured for object detection. The local feature network 304 of the domain-specific model 118 is thus configured to generate coarse object proposals using region proposal networks at a first stage, subsequently feeding the proposals and cropped features into a classification module as the second stage. Although described and illustrated in terms of a two-stage FRCNN configured for object detection, the domain-specific model 118 may be configured using any suitable architecture and tailored to any task or objective. For instance, the domain-specific model 118 may be configured using other single or plural-stage architectures.

Under an object detection objective for document classification, global features describe an image as a whole to generalize overall depicted content, whereas local features scope down to describe subset regions of an image, identifying particularly what is depicted in a certain region. In this manner, local image features may include contour representations, shape descriptor, and texture features, where the global features provide further context for the local descriptors, such as object identifiers for objects bounded by detected contours or shapes, the particular texture depicted in an image patch, and so forth.

The local features 306 extracted by the local feature network 304 are then communicated to a global feature network 308, which is configured to extract global features 310 for the input data 302 and communicate both the local features 306 and the global features 310 to a detection network 312. The local feature network 304 and the global feature network 308 are each representative of any suitable type of machine learning model configured to perform image feature extraction. Similarly, the detection network 312 is representative of any suitable type of machine learning model configured to classify images from their extracted global and local features. The example architecture of the domain-specific model 118 utilizes the detection network 312 to identify discrete regions of the input data 302 (e.g., by implementing a region proposal network) and associate corresponding local features 306 and global features 310 that are descriptive of each discrete region. In the illustrated example, features of a discrete region are represented by block 314, where the detection network 312 is illustrated as identifying three discrete regions and their corresponding features, represented by blocks 314(1), 314(2), and 314(3).

In order to output high-fidelity document classifications, the domain-specific model 118 is further configured to supplement each discrete region and its corresponding global and local features 314 with a local context vector 316 and a global context vector 318. These local and global context vectors provide information about the input data 302 as a whole, and are individually generated for each discrete region, as represented by the ellipses labeled "1," "2," and "3," disposed vertically under callouts 316 and 318, respectively. The local and global context vectors 316 and 318 are concatenated by the detection network 312 with the corresponding discrete region features represented by block 314 to output, for each discrete region of the input data 302, a classified bounding box 320 that encompasses the region and includes at least one label describing specific content of the region.

To generate the local context vectors 316, the domain-specific model 118 implements a local domain classifier 322, which is representative of a fully-convolutional neural network configured to output a domain prediction map 324 having a same size (e.g., width and height) as the input data 302. In some implementations the local domain classifier 322 is trained using local loss 326. The local loss 326 is representative of any suitable type of loss algorithm for aligning low-level features, such as a least-squares loss. The local context vector 316 is extracted from a middle layer of the local domain classifier 322, and includes information providing context for the local features 306 of the input data 302.

To generate the global context vectors 318, the domain-specific model 118 implements a global domain classifier 328, which is representative of a fully-convolutional neural network configured to predict a domain useable to describe the input data 302 (e.g., a scanned image of a PDF document authored in English, a born-digital PDF authored in Arabic, etc.), so that the classified bounding boxes 320 are discriminative for the task of object detection across a plurality of different domains. The global loss 330 is representative of a loss function that influences the global domain classifier 328 to ignore easy-to-classify examples (e.g., instances of the input data 302 being of a same domain as training data used to generate the domain-specific model 118) and focus on difficult-to-classify examples (e.g., instances of the input data 302 being of a different domain as training data used to generate the domain-specific model 118). In this manner, the global loss 330 may be representative of a variety of different known loss functions, such as a cross-entropy loss function, a focal loss function, and the like.

By presuming any classified bounding box 320 output by the domain-specific model 118 to be unreliable when the input data 302 is representative of new domain data 122, the domain adaptation system 104 is configured to leverage information generated by the domain-specific model 118 to determine the loss function 206 for use in generating the domain-agnostic model 106. To do so, the feature representation module 110 extracts the feature representation 202 using one or more components of the domain-specific model 118. For instance, in the illustrated example of FIG. 3, the feature representation module 110 extracts the feature representation 202 using the local feature network 304 of the domain-specific model 118.

Alternatively or additionally, the feature representation module 110 extracts the feature representation for input data 302 using a different component of the domain-specific model 118, such as the global feature network 308. The feature representation 202 is then useable by the domain transfer module 112 to generate a feature probability distribution 204 for the input data 302, illustrated in the example of FIG. 3 as graphically depicting probability distributions for each pixel of the input data 302 as corresponding to a different feature channel included in the feature representation 202 (e.g., vector graphics, raster graphics, or text). The feature probability distribution 204 is then comparable by the loss module 114 to ground truth data corresponding to the input data 302 to compute loss function 206, which is useable by the training module 116 to fine-tune weights of the domain-agnostic model 106. In an example implementation where the domain-agnostic model 106 is configured using the architecture of the domain-specific model 118 as illustrated in FIG. 3, fine-tuning weights of the domain-agnostic model 106 may include fine-tuning weights associated with one or more components, such as the local feature network 304, the global feature network 308, the detection network 312, the local domain classifier 322, or the global domain classifier 328.

In some implementations, the loss function 206 is further useable by the domain adaptation system 104 to fine-tune weights of the domain transfer module 112 to progressively improve a quality of feature probability distributions 204 generated from subsequent instances of input data 302. In this manner, the domain adaptation system 104 is configured to continue processing new domain data 122 until the feature probability distributions 204 generated for new domain data 122 are within a threshold degree of difference from the corresponding ground truth data 124.

Having considered an example implementation of generating a domain-agnostic model based on an architecture of a domain-specific model, consider now a discussion of an example machine learning model architecture to be implemented by the domain-agnostic model 106 and to be trained by the domain adaptation system 104 using the techniques described herein.

Figure 4:
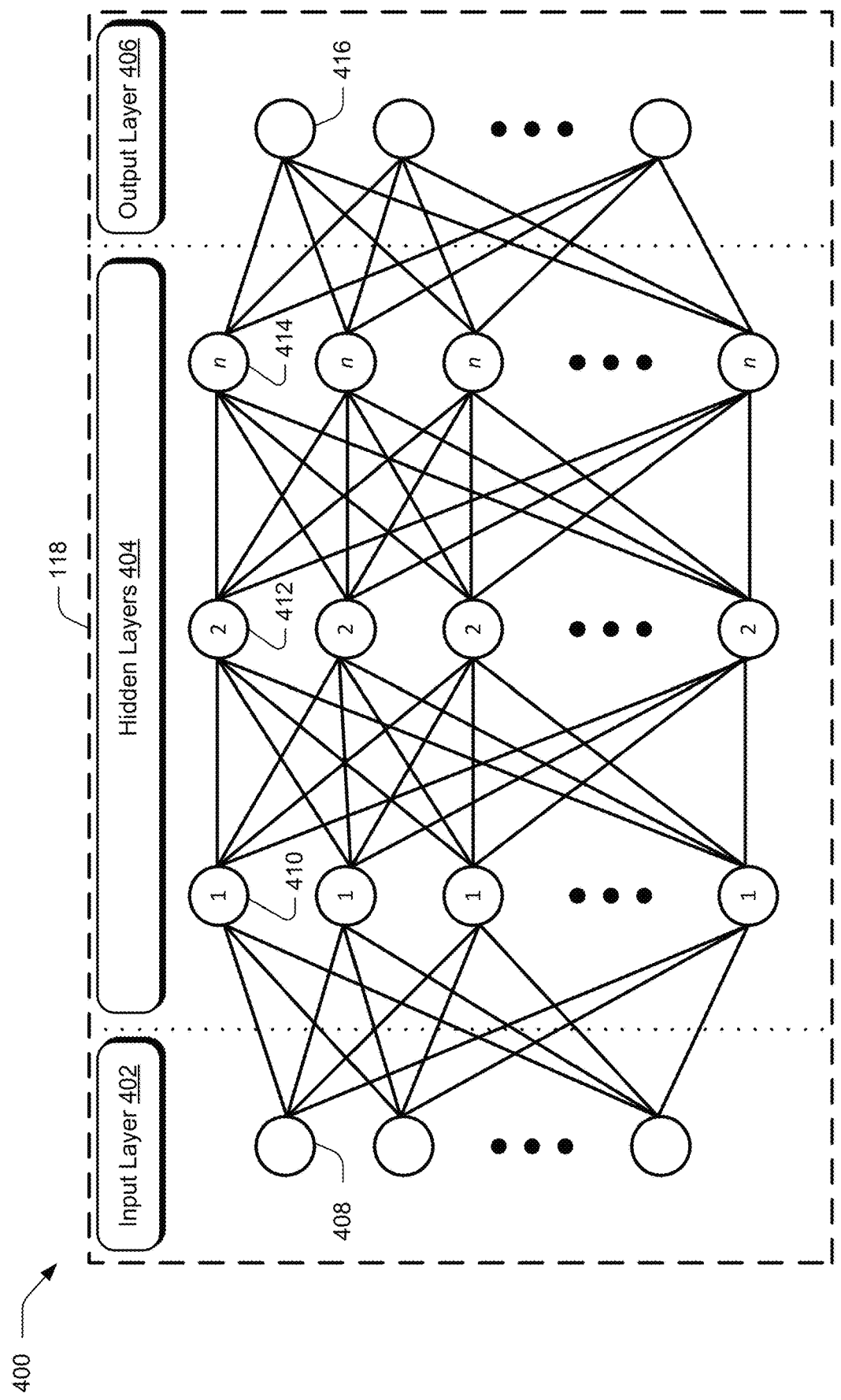
FIG. 4 illustrates an example architecture of a model to be trained by the domain adaptation system of FIG. 1 using the techniques described herein.

FIG. 4 illustrates an example architecture 400 for a machine learning model to be trained using the domain adaptation techniques described herein. In the illustrated example, the architecture 400 is representative of a portion or entirety of the domain-specific model 118 of FIG. 1 configured as a deep neural network. Generally, the goal of a deep neural network is to correctly map inputs to outputs, where input data is abstracted by the hidden layers into higher-level features to generate a desired output. For instance, in the context of a deep neural network implemented for image classification, the deep neural network may receive an image of a car as input, in the form of a matrix of pixels. Hidden layers of this example network may first abstract pixel values and output predicted edges in the image, further arrange the predicted edges to identify objects, assign labels to the identified objects (e.g., windshield, wheel, etc.). From the identified objects, the output of the example network may be a classification of the image depicting a car. This abstraction of input data into higher-level features to generate a desired output enables deep neural networks to be tailored to a wide range of different implementations. For instance, in addition to the image classification examples described herein, deep neural networks may be configured for purposes of image generation, speech recognition, text processing, graph classification, combinations thereof, and so forth.

The domain adaptation techniques described herein are useable to adapt any type of machine learning model (e.g., deep neural network), regardless of architecture or purpose for which the model is implemented, to accommodate input data of a different domain than a training dataset used to originally train the machine learning model. For explanatory purposes, references herein to deep neural networks are made under the assumption of at least part of the domain-specific model 118 being configured using example architecture 400. For instance, the example architecture 400 may be representative of an overall architecture of the domain-specific model 118, may be representative of discrete components of the domain-specific model 118 (e.g., local feature network 304, global feature network 308, detection network 312), may be representative of aspects of the domain adaptation system (e.g., segmentation network 336), and so forth.

In the illustrated example, the architecture 400 is representative of a deep neural network that includes an input layer 402, an output layer 406, and a plurality of hidden layers 404 disposed between the input and output layers. Each layer includes one or more neurons, which are individually represented by circles in the architecture 400. For instance, the input layer 402 is illustrated as including three input neurons, illustrated as vertically aligned with neuron 408. Although illustrated as only including three input neurons, the input layer 402 may include any suitable number of neurons, as illustrated by the ellipses separating the two neurons disposed below neuron 408. The hidden layers 404 are illustrated as including three different layers, where the first layer comprises neurons aligned vertically with neuron 410, labeled "1" in the example architecture 400 to represent a first hidden layer. The second layer of the hidden layers 404 comprises neurons aligned vertically with neuron 412, labeled "2" in the example architecture 400. The third layer of the hidden layers 404 comprises neurons vertically aligned with neuron 414, labeled "n" in the example architecture 400. As denoted by the ellipses in each of the hidden layers 404, a hidden layer 404 may include any number of neurons, and may include n different layers, where n represents any suitable integer.

The output layer is illustrated as including three output neurons, which are represented by neuron 416 and all neurons vertically aligned therewith. Each layer is fully connected by virtue of each neuron from one layer being connected to each neuron in the adjacent layer, as represented by the lines connecting each neuron to one or more other neurons.

Generally, each neuron is representative of a mathematical function configured to generate an output values from one or more input values. As an exception, neurons in the input layers and output layers of the example architecture 400 may not be representative of a mathematical function, and are rather illustrative of inputs to, and outputs from, the deep neural network. Each neuron included in a hidden layer of the example architecture 400 is parameterized by a weight $\theta$, where the optimal parameters of the neural network at the end of training can be represented as $\theta^*$. In an implementation where the architecture 400 is representative of the domain-specific model 118, the weights assigned to each neuron may be any suitable value, and may be assigned during training on domain-specific data.

Given one or more input values, each neuron in the hidden layers of the architecture 400 is configured to apply a linear function to its input value (e.g., by multiplying the input value(s) by the neuron's corresponding weight to output a sum of the values), and further process the resulting output using a non-linear function (e.g., a Rectified Linear Unit (ReLU) function). In some implementations, the non-linear function may alternatively be referred to as an activation function for the network. In some implementations, a deep neural network represented by the example architecture 400 may be configured to implement a number of different activation functions to obtain a desired output.

In order to tailor a deep neural network towards a specified task (e.g., classifying an input image with one or more labels), the network is trained by the training module 116 using the loss function 206. As described herein, the loss function 206 is a mathematical function that indicates how well the network is performing in the context of its specified task. A generic loss function for training a deep neural network may be represented mathematically as $L_{task}$ in Equation 1.

$$L_{task}(y, \hat{y}) = \frac{1}{m} \sum_{i=1}^{m} (y_i - \hat{y}_i)^2 \quad \text{(Eq. 1)}$$

In Equation 1, y represents the optimal value to be output by the network (e.g., a value included in a ground truth dataset used to train the neural network, such as ground truth data 124), while ŷ represents the actual output of the neural network at stage i, where training the network can proceed for m stages, with m representing any suitable integer. The goal in training the deep neural network represented by architecture 400 is to minimize the loss function for a particular task, where the loss function indicates improvement in the overall performance of the neural network as its value approaches zero.

In order to train a deep neural network, weights of various neurons illustrated in the example architecture 400 are iteratively adjusted by the training module 116 during generation of the domain-agnostic model 106, with the goal of minimizing the model's loss function for its specified task. In some implementations, the domain adaptation system 104 is configured to optimize a deep neural network's loss function using a gradient descent algorithm. Mathematically, updating weights during each iteration of a gradient descent algorithm can be represented as set forth in Equation 2.

$$w_j = w_j - lr \partial \frac{L_{task}}{\partial w_j} \quad \text{(Eq. 2)}$$

In Equation 2, $w_j$ represents a weight for at least one neuron in the example architecture 400, and lr represents a learning rate, such that an updated weight is defined by subtracting its derivative and multiplying by the learning rate. The learning rate lr is representative of a hyper-parameter to be tuned based on the particular task for which the domain-agnostic model 106 is trained. To improve training efficiency, rather than computing loss derivatives at each iteration of a gradient descent algorithm, loss derivatives may be approximated by the loss module 116 using certain gradient descent algorithms (e.g., stochastic gradient descent), coupled with backpropagation. Weights of the domain-agnostic model 106 are then iteratively updated by the training module 116 to improve performance when applied to new domain data 122 during training until the model's output(s) achieves a threshold difference relative to the ground truth data 124. This threshold difference may be any suitable metric, and may be specified by a user of the domain adaptation system 104.

Having considered example details of generating a domain-agnostic model 106 from a domain-specific model 118 using a new domain dataset 120, consider now example procedures to illustrate aspects of the techniques described herein.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-4.

Figure 5:
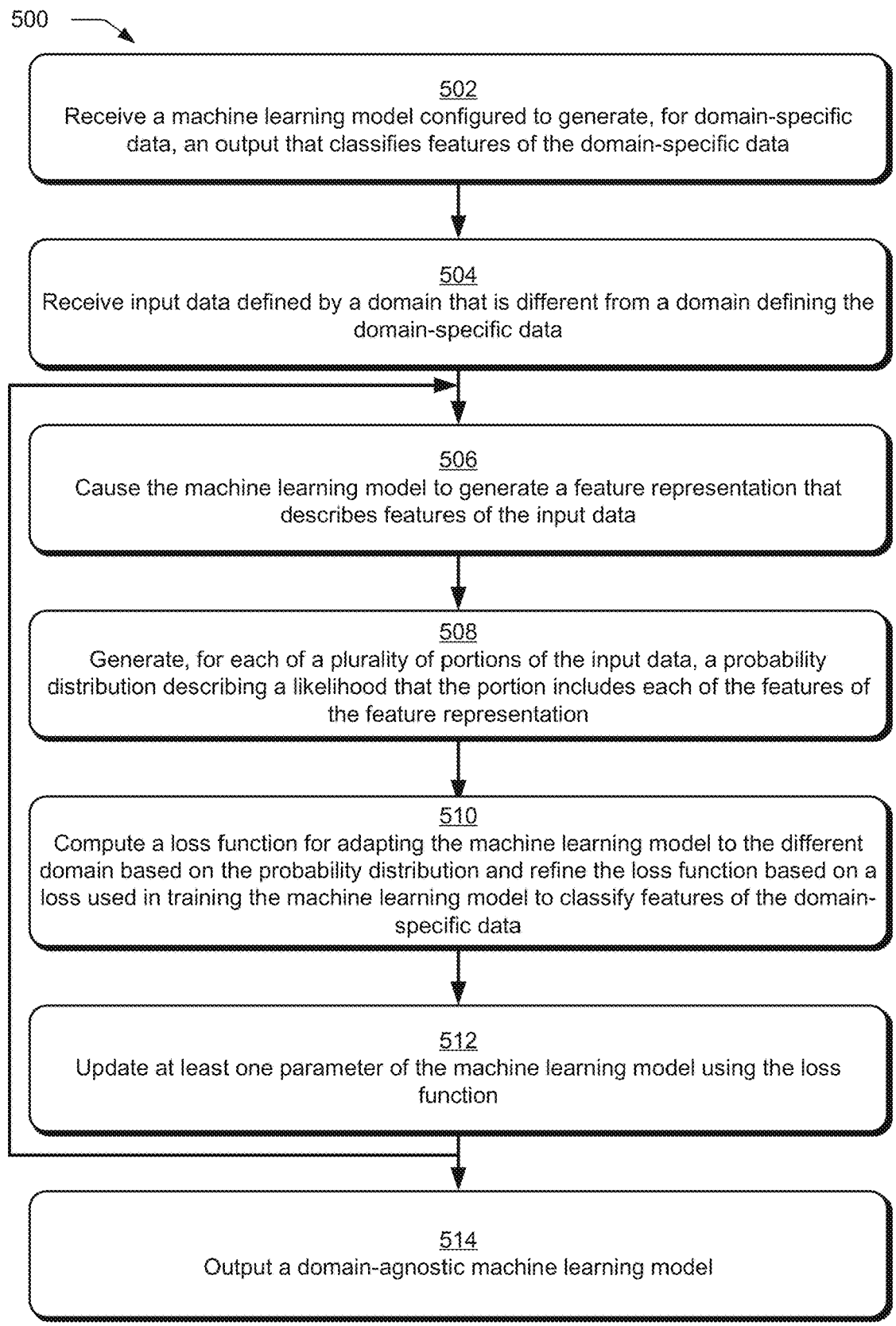
FIG. 5 is a flow diagram depicting a procedure in an example implementation for generating a domain-agnostic model using the techniques described herein.

FIG. 5 depicts a procedure 500 in an example implementation of generating a domain-agnostic machine learning model in accordance with aspects of the techniques described herein. A machine learning model configured to generate an output that classifies features of domain-specific data is received (block 502). The input module 108 of the domain adaptation system 104, for instance, receives the domain-specific model 118. The domain-specific model 118 may be obtained from input to a computing device implementing the domain adaptation system 104, such as computing device 102, may be received from remote storage location 126, may be received from a different computing device via network 128, or combinations thereof. The domain-specific model 118 is representative of a machine learning model trained to perform an object detection objective using a training dataset, the data types and associated enumerated values of which are useable to define a domain for the domain-specific model 118.

Input data defined by a domain that is different from the domain of the training dataset is then received (block 504). The input module 108, for instance, receives the new domain dataset 120 from input to the computing device 102, from remote storage location 126, from a different computing device via network 128, or combinations thereof. The new domain dataset 120 includes at least one instance of new domain data 122 and corresponding ground truth data 124 for each instance of new domain data 122. The ground truth data 124 is representative of optimal outputs to be produced by the domain-agnostic model 106, provided the new domain data 122 as input, when processing the new domain data 122 according to the auxiliary task used to adapt the domain-specific model 118 to the new domain. In accordance with one or more implementations, the new domain dataset 120 obtained by the input module 108 is dependent on a task or objective for which the domain-specific model 118 is originally configured.

As described herein, the domain-specific model 118 is representative of a machine learning model trained to generate predicted outputs from input data that is defined by at least one data type having one or more enumerated data values. For instance, the input data used to train the domain-specific model 118 may comprise user identifying information, where one data type of the input data is "gender" and another data type is "location." Enumerated values for the gender data type may include male, female, and null (e.g., representative of unknown or inapplicable). Enumerated values for the location data type may include any data format useable to identify a geographic location, such as city, county, state, country, zip code, mailing address, and so forth. Thus, a domain to which the domain-specific model 118 corresponds may be defined in terms of the data types and data values of training data used to generate the domain-specific model 118, and is not limited to any one or more specific data types and values.

The machine learning model is then caused to generate a feature representation that describes features of the input data (block 506). The feature representation module 110, for instance, receives the domain-specific model 118 and at least one instance of new domain-data 122 from the input module 108. The feature representation module 110 then uses at least a portion of the domain-specific model 118 to generate a feature representation 202 by processing the new domain data 122 according to the objective for which the domain-specific model 118 was trained.

For instance, in an example implementation where the domain-specific model 118 is configured according to the architecture illustrated in FIG. 3, the feature representation module 110 may use one or more convolutional neural networks of the domain-specific model 118 (e.g., one or more of the local feature network 304, the global feature network 308, the detection network 312, the local domain classifier 322, or the global domain classifier 328) to generate feature representation 202. The feature representation 202 is thus representative of information extracted from the new domain data 122 that identifies different feature channels useable to describe content included in or otherwise represented by the new domain data 122.

A probability distribution is then generated for each of a plurality of portions of the input data, where the probability distribution describes a likelihood that the portion includes each of the feature channels identified by the feature representation (block 508). The domain transfer module 112, for instance, processes the feature representation 202 to generate a feature probability distribution 204 for the new domain data 122 using information included in the feature representation 202. In some implementations, the domain transfer module 112 employs its own machine learning model (e.g., a convolutional neural network) to generate the feature probability distribution 204, given the feature representation 202 and the new domain data 122 as inputs. The feature probability distribution 204 is representative of probability scores for each discrete component or region of the new domain data 122, where the probability score indicates a likelihood of the corresponding region or component of the new domain data 122 including one or more of the feature channels described in the feature representation 202.

For instance, in an example implementation where the new domain data 122 comprises an image, the corresponding feature representation 202 may include three different feature channels useable to differentiate among different content depicted by the image. In such an example implementation, the feature probability distribution 204 may include three binary distributions for each pixel of the image, where each binary distribution represents a probability of the pixel depicting content classified under a corresponding feature channel. In this manner, the feature probability distribution 204 may describe probability scores for each discrete region of new domain data 122 as corresponding to one or more feature channels set forth in the feature representation 202 numerically, textually, graphically, and so forth.

A loss function is then computed for adapting the machine learning model to the different domain based on the probability distribution, and further refined based on a loss used in training the machine learning model to classify features of the domain-specific data (block 510). The loss module 114, for instance, compares the feature probability distribution 204 generated for an instance of new domain data 122 to corresponding ground truth data 124 for the new domain data 122. The loss module 114 then generates loss function 206 based on this comparison, which may be performed in a variety of different manners, such as based on absolute differences, using mean squared error, and so forth. The loss function 206 may be further refined based on one or more losses used to train the domain-specific model 118, such as one or more of the local loss 326 or global loss 330, as illustrated in FIG. 3 via the double-headed arrow connecting loss function 206 to the domain-specific model 118. The loss module 116 is configured to vary a schedule and/or ratio by which the loss function 206 is refined based on one or more of the local loss 326 or the global loss 330. The schedule and ratio by which the loss function 206 is refined based on the local loss 326 and/or the global loss 330 may be dependent on a task of interest for which the domain-specific model 118 is trained and/or the auxiliary task for which the domain-agnostic model 106 is trained to process different domain data.

At least one parameter of the machine learning model is then updated using the loss function (block 512). The training module 116, for instance, tunes at least one parameter of the domain-agnostic model 106 based on the loss function 206. In some implementations, parameters of the domain-agnostic model 106 are initialized by the training module 116 based on parameters of the domain-specific model 118. In this manner, prior to updating by the training module 116 based on the loss function 206, the domain-agnostic model 106 may be representative of a copy of the domain-specific model 118.

In an example implementation where the domain-agnostic model 106 is configured according to the example architecture illustrated in FIG. 4, tuning at least one parameter of the model is performed by adjusting weights associated with one or more neurons of the domain-agnostic model 106. Operation may then return to block 506, where the domain adaptation system 104 selects a new instance of new domain data 122 for use in further refining the domain-agnostic model 106. This cycle of performing operations described in blocks 506, 508, 510, and 512 may be repeated until a determination is made that a difference between the probability distribution(s) and the ground truth information is within a threshold amount of difference.

In response to determining that the difference between the probability distribution(s) and the ground truth information is within a threshold amount, the model with its current parameters is output as a domain-agnostic machine learning model (block 514). The domain adaptation system 104, for instance, outputs the domain-agnostic model 106, which is representative of a set of instances of the domain-specific model 118 configured to generate reliable outputs provided input data of a new domain, different from a domain of training data used to originally configure the domain-specific model 118. The domain-agnostic model 106 may be output to local storage of the computing device implementing the domain adaptation system 104, such as computing device 102. Alternatively or additionally, the domain-agnostic model 106 may be output to one or more storage locations that are remote from the computing device 102, such as to remote storage location 126, or to a different computing device, via network 128.

Figure 6:
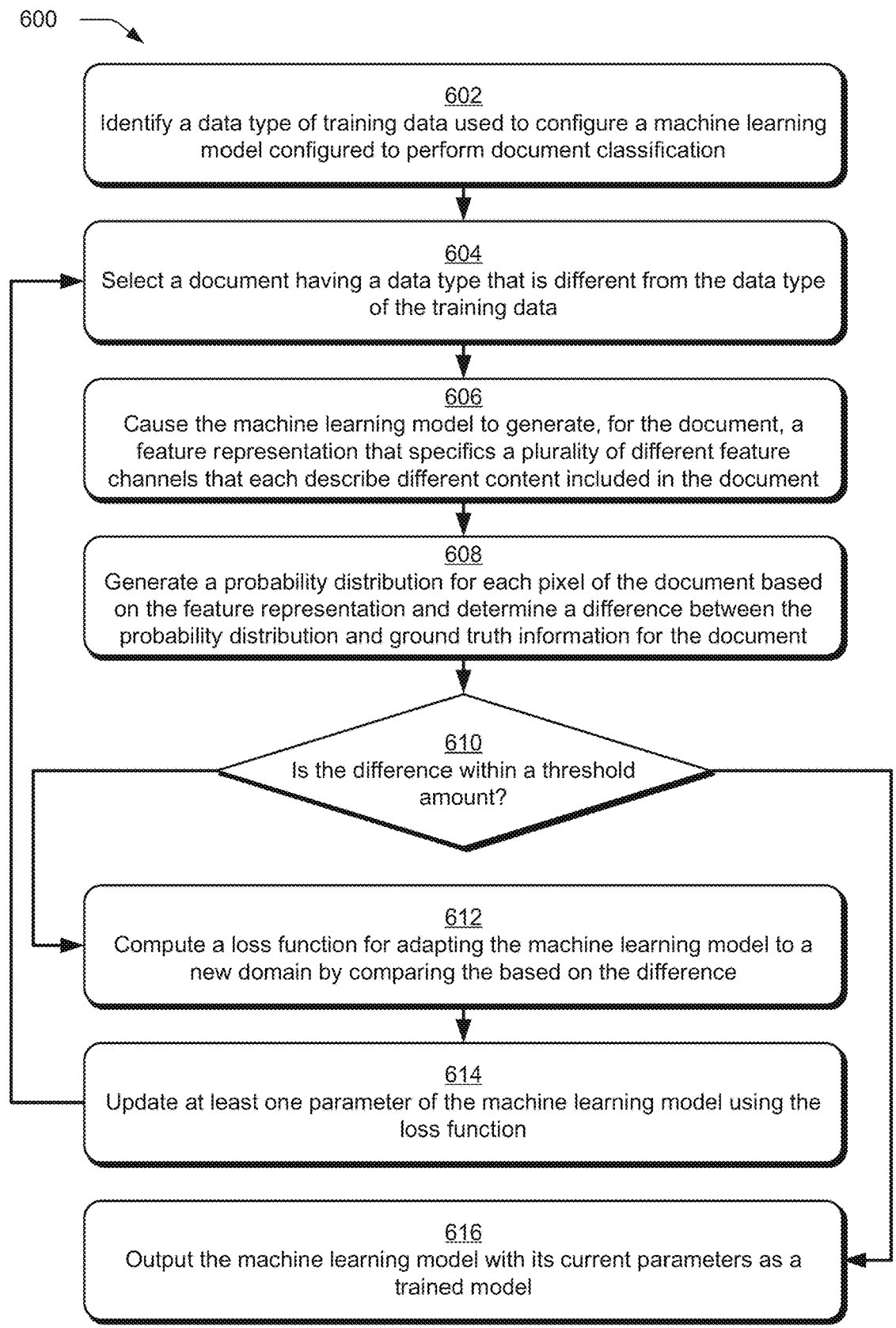
FIG. 6 is a flow diagram depicting a procedure in an example implementation for generating a domain-agnostic image classification model using the techniques described herein.

FIG. 6 depicts a procedure 600 in an example implementation of generating a domain-agnostic machine learning model in accordance with aspects of the techniques described herein. A data type of training data used to configure a machine learning model configured to perform document classification is identified (block 602). The input module 108 of the domain adaptation system 104, for instance, receives a domain-specific model 118 together with an indication of training data used to generate the domain-specific model 118. A document having a data type that is different from the data type of the training data is then selected (block 604). The input module 108, for instance, obtains a new domain dataset 120 having new domain data 122 of a data type that is different from a training data type used to generate the domain-specific model 118.

The machine learning model is then caused to generate, a feature representation for the document that specifies a plurality of different feature channels that each describe different content included in the document (block 606). The feature representation module 110, for instance, receives the domain-specific model 118 and at least one instance of new domain-data 122 from the input module 108. The feature representation module 110 then uses at least a portion of the domain-specific model 118 to generate a feature representation 202 by processing the new domain data 122 according to the document object detection objective used to train the domain-specific model 118.

For instance, in an example implementation where the domain-specific model 118 is configured to perform document classification according to the architecture illustrated in FIG. 3, the feature representation module 110 may use one or more convolutional neural networks of the domain-specific model 118 (e.g., one or more of the local feature network 304, the global feature network 308, the detection network 312, the local domain classifier 322, or the global domain classifier 328) to generate feature representation 202. The feature representation 202 is thus representative of information extracted from the new domain data 122 that identifies different feature channels useable to describe content depicted in the document represented by the new domain data 122.

A probability distribution is then generated for each pixel of the document based on the feature representation and used to determine a difference between an output of the machine learning model and corresponding ground truth information classifying the document (block 608). The domain transfer module 112, for instance, processes the feature representation 202 to generate a feature probability distribution 204 for the new domain data 122 using information included in the feature representation 202. In some implementations, the domain transfer module 112 employs its own machine learning model (e.g., a convolutional neural network) to generate the feature probability distribution 204, given the feature representation 202 and the new domain data 122 as inputs. The feature probability distribution 204 is representative of probability scores for each pixel or other discrete region of the document represented by new domain data 122, where the probability score indicates a likelihood of the pixel including a display one or more of the feature channels described in the feature representation 202.

For instance, in an example implementation where the new domain data 122 comprises an image of an electronic document, the corresponding feature representation 202 may include three different feature channels useable to differentiate among different content depicted by the image. In such an example implementation, the feature probability distribution 204 may include three binary distributions for each pixel of the image, where each binary distribution represents a probability of the pixel depicting content classified under a corresponding feature channel (e.g., a text feature channel, a vector graphic feature channel, and a raster graphic feature channel).

A determination is then made as to whether the difference between the probability distribution and the ground truth information is within a threshold amount (block 610). The loss module 114, for instance, quantifies a difference between the feature probability distribution 204 generated by the domain transfer module 112 and the ground truth data 124 for an instance of new domain data 122 for which the feature probability distribution 204 was generated. In some implementations, the threshold amount of difference the feature probability distribution 204 and the ground truth data 124 is zero (i.e., that the threshold amount of difference requires the feature probability distribution 204 to be identical to the ground truth data 124). Alternatively, the threshold amount of difference may specify a percentage difference between the feature probability distribution 204 and the ground truth data 124 (e.g., 5% difference). The threshold amount of difference may be pre-specified by the domain adaptation system 104. Alternatively or additionally, the threshold amount of difference may be specified or adjusted via input received from a user of a computing device implementing the domain adaptation system 104.

In response to determining that the difference between the probability distribution and the ground truth information is not within the threshold amount, a loss function for adapting the machine learning model to a new domain is computed based on the difference (block 612). The loss module 114, for instance, compares the feature probability distribution 204 generated for an instance of new domain data 122 to corresponding ground truth data 124 for the new domain data 122. The loss module 114 then generates loss function 206 based on this comparison, which may be performed in a variety of different manners, such as based on absolute differences, using mean squared error, and so forth.

At least one parameter of the machine learning model is then updated using the loss function (block 614). The training module 116, for instance, tunes at least one parameter of the domain-agnostic model 106 based on the loss function 206. In some implementations, parameters of the domain-agnostic model 106 are initialized by the training module 116 based on parameters of the domain-specific model 118. In this manner, prior to updating by the training module 116 based on the loss function 206, the domain-agnostic model 106 may be representative of a copy of the domain-specific model 118. In an example implementation where the domain-agnostic model 106 is configured according to the example architecture illustrated in FIG. 4, tuning at least one parameter of the model is performed by adjusting weights associated with one or more neurons of the domain-agnostic model 106. Operation may then return to block 506, where the domain adaptation system 104 selects a new instance of new domain data 122 for use in further refining the domain-agnostic model 106. Operation then returns to block 604, where the domain adaptation system selects a new instance of new domain data 122 for use in generating the domain-agnostic model 106. The cycle of operations described in blocks 604, 606, 608, and 610 is repeated until a determination is made that a difference between a probability distribution and ground truth information for an instance of new domain data 122 currently being processed is within a threshold amount.

In response to determining that the difference between the probability distribution and the ground truth information is within the threshold amount, the machine learning model with its current parameters is output as a trained model (block 616). The domain adaptation system 104, for instance, outputs the domain-agnostic model 106, which is representative of an instance of the domain-specific model 118 configured to perform document classification on input documents having a data type or enumerated data values that distinguish the documents from a domain of training data used to generate the domain-specific model 118. The domain-agnostic model 106 may be output to local storage of the computing device implementing the domain adaptation system 104, such as computing device 102. Alternatively or additionally, the domain-agnostic model 106 may be output to one or more storage locations that are remote from the computing device 102, such as to remote storage location 126, or to a different computing device, via network 128.

Having described example procedures in accordance with one or more implementations, consider now an example system and device that can be utilized to implement the various techniques described herein.

Example System and Device

Figure 7:
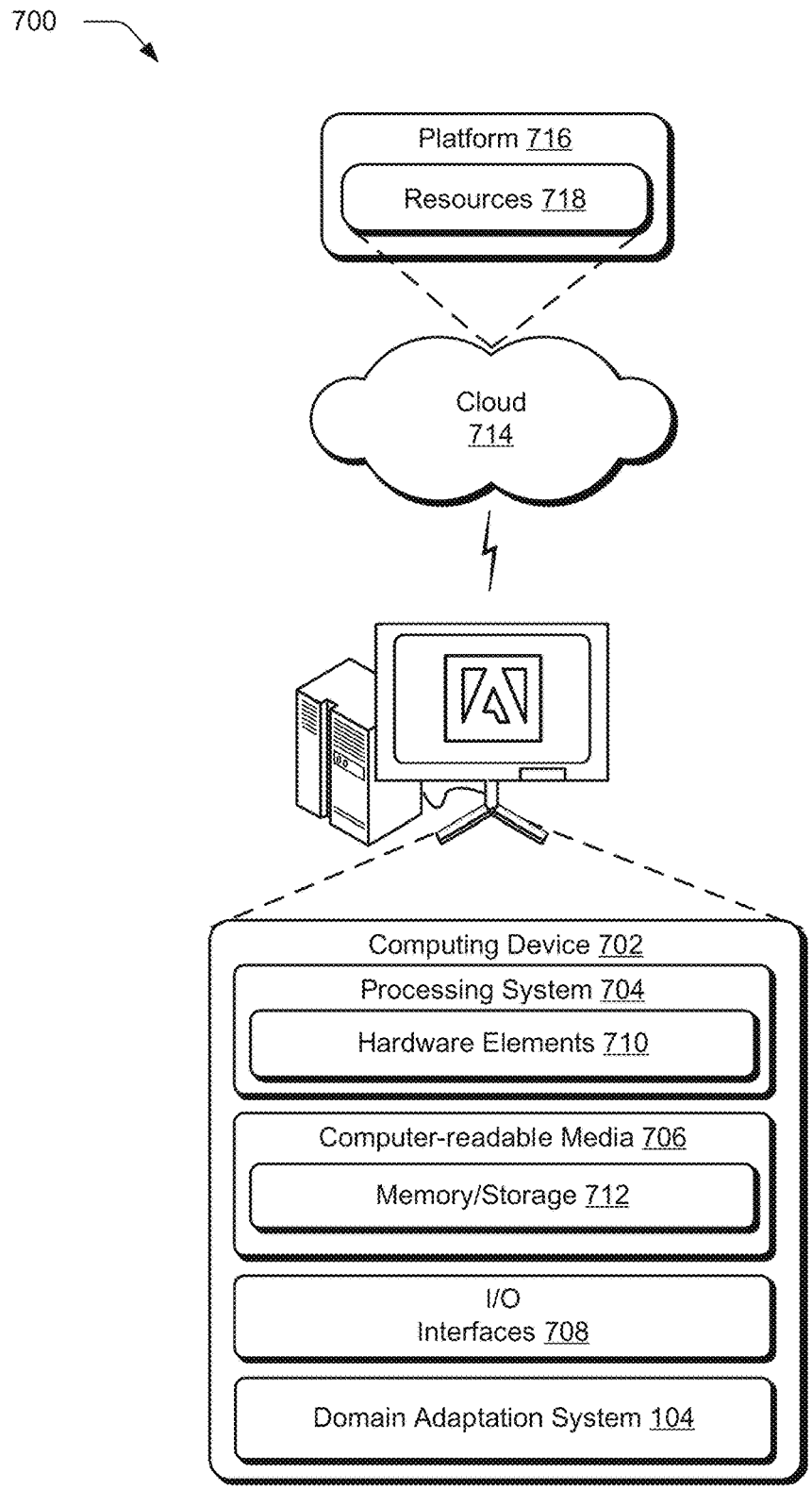
FIG. 7 illustrates an example system including various components of an example device that can be implemented as a computing device as described and/or utilized with reference to FIGS. 1-6 to implement the techniques described herein.

FIG. 7 illustrates an example system generally at 700 that includes an example computing device 702 that is representative of one or more computing systems and/or devices that may implement the various techniques described herein. This is illustrated through inclusion of the domain transfer system 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

In the illustrated example, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for adapting a machine learning model to a new domain, a method implemented by at least one computing device, the method comprising:
    obtaining a machine learning model configured to receive an input image defined by a first domain and generate an output that classifies the input image by:
        extracting local features that identify different regions of the input image using a local feature network;
        ascertaining global features that describe objects included in the different regions of the input image by processing the local features using a global feature network; and
        assigning a label to each of the different regions of the input image using the local features and the global features;
    training the machine learning model to classify an input image defined by a second domain that is different from the first domain by:
        causing the local feature network to generate a feature representation that describes local features of the second domain input image;
        generating a probability distribution for each of a plurality of discrete regions of the second domain input image by processing the feature representation using a fully convolutional neural network trained upon a segmentation objective;
        computing a loss function by comparing the probability distribution to a ground truth classification for the second domain input image; and
        refining at least one parameter of the machine learning model using the loss function; and
    outputting the machine learning model with its at least one parameter as the trained machine learning model.

2. The method as recited in claim 1, wherein the first domain comprises images of documents configured in a specified file type, authored in a particular language, and formatted in a certain layout.

3. The method as recited in claim 1, wherein the local features and features of the second domain input image include vector graphics, text elements, and raster graphics.

4. The method as recited in claim 1, wherein assigning the label to each of the different regions of the input image comprises generating a local context vector for each of the different regions by processing the local features using a local domain classifier trained to align image features with a local feature alignment objective.

5. The method as recited in claim 1, wherein the local feature network is configured as a faster region convolutional neural network configured for object detection.

6. The method as recited in claim 1, wherein assigning the label to each of the different regions of the input image comprises generating a global context vector for each of the different regions by processing the global features using a global domain classifier trained to predict a domain of the input image.

7. The method as recited in claim 1, further comprising refining at least one parameter of the fully convolutional neural network used to generate the probability distribution for each of the plurality of discrete regions of the second domain input image using the loss function.

8. The method as recited in claim 1, wherein the second domain input image comprises an image of a document, the method further comprising obtaining the document, extracting metadata from the document, and generating the ground truth classification for the second domain input image using the extracted metadata.

9. The method as recited in claim 1, wherein the ground truth classification for the second domain input image comprises a labeled version of the second domain input image that includes at least one of:
 a vector graphic bounding box identifying a vector graphic in the second domain input data;
 a text bounding box identifying text in the second domain input data; or
 a raster graphic bounding box identifying a raster graphic in the second domain input data.

10. The method as recited in claim 1, wherein training the machine learning model to classify the second domain input image further comprises:
 receiving a different input image defined by the first domain;
 causing the local feature network to generate a feature representation that describes local features of the different first domain input image;
 generating a probability distribution for each of a plurality of discrete regions of the different first domain input image by processing the feature representation using the fully convolutional neural network trained upon the segmentation objective; and
 updating the loss function by comparing the probability distribution to a ground truth classification for the different first domain input image.

11. In a digital medium environment for adapting a document classification model to a new domain, a method implemented by at least one computing device, the method comprising:
 adapting the document classification model to the new domain by:
  identifying a data type of training data used to generate the document classification model;
  obtaining a new domain document having a data type that is different from the data type of the training data;
  causing the document classification model to generate a feature representation describing a plurality of different feature channels that each describe different content included in the new domain document;
  generating a probability distribution for each pixel of the new domain document based on the feature representation, the probability distribution describing a likelihood of the pixel depicting each of the plurality of different feature channels;
  determining a loss function by comparing the probability distribution to a ground truth for the new domain document; and
  refining one or more parameters of the document classification model using the loss function; and
 outputting the document classification model with the one or more parameters as a domain-agnostic document classification model.

12. The method as recited in claim 11, wherein the training data comprises a rasterized image of a document and the document classification model is configured to output at least one bounding box for the rasterized image with a label describing content enclosed by the at least one bounding box.

13. The method as recited in claim 12, wherein the label describes at least one of paragraph content, list item content, header content, figure content, table content, or background content.

14. The method as recited in claim 11, wherein the feature channels described by the feature representation include a vector graphic feature channel, a text feature channel, and a raster graphic feature channel.

15. The method as recited in claim 11, wherein the training data comprises a document authored in English and the new domain document is authored in a language other than English.

16. The method as recited in claim 11, wherein the ground truth comprises a labeled version of the new domain document that includes at least one of:
 a vector graphic bounding box identifying a vector graphic in the new domain document;
 a text bounding box identifying text in the new domain document; or
 a raster graphic bounding box identifying a raster graphic in the new domain document.

17. The method as recited in claim 11, further comprising repeating the obtaining, the causing, the generating, the determining, and the refining using at least one additional new domain document until determining that a difference between the probability distribution for the additional new domain document and the ground truth for the additional new domain document satisfies a difference threshold.

18. The method as recited in claim 11, wherein the document classification model comprises a neural network including a plurality of neurons, and refining the one or more parameters of the document classification model based on the loss function comprises updating a weight value for at least one of the plurality of neurons.

19. The method as recited in claim 11, further comprising extracting metadata from the new domain document and generating the ground truth using the extracted metadata.

20. A system comprising:
 one or more processors; and
 a computer-readable medium having instructions stored thereon that are executable by the one or more processors to perform operations comprising:
  receiving a machine learning model configured to process first domain data and generate an output that classifies features of the first domain data;
  training the machine learning model to process data of a second domain that is different from the first domain by:

causing the machine learning model to generate, from the second domain data, a feature representation that describes features of the second domain data;

generating a probability distribution for each of a plurality of discrete regions of the second domain data based on the feature representation, the probability distribution describing a likelihood of the discrete region including each of the features described by the feature representation;

computing a loss function by comparing the probability distribution to a ground truth classification for the second domain data; and refining at least one parameter of the machine learning model using the loss function; and outputting the machine learning model with its at least one parameter as the trained machine learning model.

* * * * *